US011113790B2

(12) United States Patent
Marrs et al.

(10) Patent No.: US 11,113,790 B2
(45) Date of Patent: Sep. 7, 2021

(54) ADDING GREATER REALISM TO A COMPUTER-GENERATED IMAGE BY SMOOTHING JAGGED EDGES

(71) Applicant: NVIDIA Corporation, Santa Clara, CA (US)

(72) Inventors: Adam Christopher Marrs, Cary, NC (US); Josef B. Spjut, Rancho Cucamonga, CA (US); Holger Heinrich Gruen, Bavaria (DE); Morgan McGuire, Williamstown, MA (US); Rahul Sathe, Folsom, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/363,927

(22) Filed: Mar. 25, 2019

(65) Prior Publication Data

US 2019/0318454 A1    Oct. 17, 2019

Related U.S. Application Data

(60) Provisional application No. 62/659,620, filed on Apr. 18, 2018, provisional application No. 62/656,951, filed on Apr. 12, 2018.

(51) Int. Cl.
| | |
|---|---|
| *G06T 5/00* | (2006.01) |
| *G06T 15/06* | (2011.01) |
| *G06T 7/50* | (2017.01) |
| *G06T 5/50* | (2006.01) |

(52) U.S. Cl.
CPC ............... *G06T 5/002* (2013.01); *G06T 5/50* (2013.01); *G06T 7/50* (2017.01); *G06T 15/06* (2013.01); *G06T 2207/20192* (2013.01); *G06T 2210/08* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 7,212,215 B2 | 5/2007 | Sasaki et al. | |
| 7,446,780 B1 | 11/2008 | Everitt et al. | |
| 9,001,144 B2 | 4/2015 | Ihm et al. | |
| 9,177,413 B2 | 11/2015 | Tatarinov et al. | |

(Continued)

FOREIGN PATENT DOCUMENTS

| | | |
|---|---|---|
| CN | 105096370 B | 8/2017 |
| CN | 107483771 A | 12/2017 |

OTHER PUBLICATIONS

NVIDIA, "NVIDIA OptiX Ray Tracing Engine," NIVIDIA Developer, retrieved on Mar. 18, 2019, from https://developer.nvidia.com/optix, 8 pages.

(Continued)

*Primary Examiner* — Saptarshi Mazumder
(74) *Attorney, Agent, or Firm* — Hogan Lovells US LLP

(57) ABSTRACT

During the rendering of an image, specific pixels in the image are identified where antialiasing would be helpful. Antialiasing is then performed on these identified pixels, where anti-aliasing is a technique used to add greater realism to a digital image by smoothing jagged edges. This reduces a cost of performing antialiasing by reducing a number of pixels within an image on which antialiasing is performed.

22 Claims, 11 Drawing Sheets

(56) References Cited

U.S. PATENT DOCUMENTS

| | | | |
|---|---|---|---|
| 9,275,492 B2 | 3/2016 | Foo et al. | |
| 9,547,918 B2 | 1/2017 | Clarberg | |
| 9,704,270 B1 | 7/2017 | Main et al. | |
| 2007/0109318 A1 | 5/2007 | Tuomi | |
| 2007/0153023 A1 | 7/2007 | Chladny | |
| 2008/0152231 A1* | 6/2008 | Gokturk | G06Q 30/08 382/209 |
| 2008/0238920 A1* | 10/2008 | Brown | G06T 15/06 345/426 |
| 2008/0240239 A1* | 10/2008 | Stuart | H04N 19/137 375/240.12 |
| 2014/0022237 A1* | 1/2014 | Aila | G06T 15/06 345/419 |
| 2014/0247277 A1 | 9/2014 | Guenter et al. | |
| 2014/0267238 A1 | 9/2014 | Lum et al. | |
| 2014/0314147 A1* | 10/2014 | Rusanovskyy | H04N 19/517 375/240.12 |
| 2015/0084981 A1 | 3/2015 | Clarberg | |
| 2015/0262407 A1 | 9/2015 | Fursund et al. | |
| 2015/0262409 A1 | 9/2015 | Morgan et al. | |
| 2016/0071246 A1* | 3/2016 | Uralsky | G06T 11/40 345/611 |
| 2017/0132833 A1 | 5/2017 | Sathe | |
| 2017/0169602 A1 | 6/2017 | Blackmon et al. | |
| 2017/0206638 A1* | 7/2017 | Fainstain | G06T 19/20 |
| 2017/0272722 A1 | 9/2017 | Salvi et al. | |
| 2019/0236758 A1* | 8/2019 | Kim | G06T 11/40 |
| 2019/0318455 A1 | 10/2019 | Gruen et al. | |

OTHER PUBLICATIONS

Intel, "Intel Embree High Performance Ray Tracing Kernels," Intel Corporation, 2018, 17 pages, retrieved from https://embree.github.io/.

NVIDIA, "OptiX Programming Guide," NVIDIA GameWorks Documentation Rev. 1.0.180103, 2018, 3 pages, retrieved from https://docs.nvidia.com/gameworks/content/gameworkslibrary/optix/optix_programming_guide.htm.

Microsoft, "Root Signatures," Microsoft, May 30, 2018, 2 pages, retrieved from https://docs.microsoft.com/en-us/windows/desktop/direct3d12/root-signatures.

Microsoft, "Conservative Rasterization," Microsoft, May 30, 2018, 10 pages retrieved from https://docs.microsoft.com/en-us/windows/desktop/direct3d12/conservative-rasterization.

Rodriguez, S., "Implementing FXAA," Jul. 30, 2016, 19 pages, retrieved from http://blog.simonrodriguez.fr/articles/30-07-2016_implementing_fxaa.html.

Shevetsov et aL, "Low Cost Adaptive Anti-Aliasing for Real-Time Ray-Tracing," Graphicon, Jan. 2010, 4 pages, retrieved from https://www.researchgate.net/publication/268072117_Low_Cost_Adaptive_Anti-Aliasing_for_Real-Time_Ray-Tracing.

Jin et al., "Selective and Adaptive Supersampling for Real-Time Ray Tracing," Proceedings of the ACM SIGGRAPH/EUROGRAPHICS Conference on High Performance Graphics, Jan. 2009, 9 pages, retrieved from https://www.researchgate.net/publication/221249033_Selective_and_adaptive_supersampling_for_real-time_ray_tracing.

AWS Amazon, "Temporal Antialiasing and Supersampling," Amazon Lumberyard, User Guide, retrieved on Jun. 27, 2018 from https://docs.aws.amazon.com/lumberyard/latest/userguide/graphics-rendering-anti-aliasing.html, pp. 1-5.

Caustic, "OpenRL SDK: Ray Tracing's First Cross-Platform API," retrieved on May 1, 2019, from http://imgtec.eetrend.com/sites/imgtec.eetrend.com/files/article/201402/1495-2162-1.pdf, pp. 1-5.

MJP, "A Quick Overview of MSAA—The Danger Zone," Blog at Wordpress, Aug. 26, 2017, pp. 1-21, retrieved from https://mynameismjp.wordpress.com/2012/10/24/msaa-overview/.

Akenine-Moller et al., "Conservative and Tiled Rasterization Using a Modified Triangle Setup," Draft: the definitive version appears in JGT vol. 10, Issue 3, 2005, pp. 1-7.

Liktor et al., "Decoupled Deferred Shading for Hardware Rasterization," Proceedings of the ACM SIGGRAPH Symposium on Interactive 3D Graphics and Games, 2012, 8 pages.

Bertoa, N., "Road to Anti-Aliasing in BRE: Rasterization," Wordpress, Sep. 11, 2017, pp. 1-18, retrieved from https://nbertoa.wordpress.com/2017/09/11/road-to-anti-aliasing-in-bre-rasterization/.

Wyman et al., "Frustum-Traced Irregular Z-Buffers: Fast, Sub-pixel Accurate Hard Shadows," IEEE Transactions on Visualization and Computer Graphics, 2016, pp. 1-13.

Gruen et al., U.S. Appl. No. 16/363,941, filed Mar. 25, 2019.

Karis, B., "High-Quality Temporal Supersampling," A course in Advances in Real-Time Rendering in 3D Graphics and Games, Vancouver SIGGRAPH 2014 Courses, 2014, 12 pages retrieved from http://advances.realtimerendering.com/s2014/index.html#_HIGH-QUALITY_TEMPORAL_SUPERSAMPLING.

Karis, B., "High-Quality Temporal Supersampling," SIGGRAPH 2014 Advances in Real-Time Rendering in Games, Course Power Point Presentation, 2014, 55 pages.

Auzinger et al., "Non-Sampled Anti-Aliasing," The Eurographics Association, Vision, Modeling, and Visualization, 2013, 8 pages, retrieved from https://research.nvidia.com/publication/subpixel-reconstruction-antialiasing.

Chajdas et al., "Subpixel Reconstruction Antialiasing for Deferred Shading," Symposium on Interactive 3D Graphics and Games, I3D '11, 2011, 7 pages, retrieved from https://research.nvidia.com/sites/default/files/pubs/2011-02_Subpixel-Reconstruction-Antialiasing/I3D11.pdf.

Christensen et al., "Ray Differentials and Multiresolution Geometry Caching for Distribution Ray Tracing in Complex Scenes," Eurographics, Computer Graphics Forum, vol. 22, No. 3, 2003, 10 pages.

Crassin et al., "Aggregate G-Buffer Anti-Aliasing," Proceedings of the ACM Symposium on Interactive 3D Graphics and Games (I3D'15), Feb. 1, 2015, 11 pages, retrieved from https://research.nvidia.com/publication/aggregate-g-buffer-anti-aliasing.

Hollander et al., "Adaptive Supersampling for Deferred Anti-Aliasing," Journal of Computer Graphics Techniques, vol. 2, No. 1, 2013, pp. 1-14.

Igehy, H., "Tracing Ray Differentials," Proceedings of Computer Graphics, SIGGRAPH, 1999, 8 pages, retrieved from https://graphics.stanford.edu/papers/trd/.

Jimenez et al., "SMAA: Enhanced Subpixel Morphological Antialiasing," Eurographics Computer Graphics Forum, vol. 31, No. 2, 2012, 15 pages.

Kobbelt et al., "A Survey of Point-Based Techniques in Computer Graphics," preprint submitted to Elsevier Science, 2004, pp. 1-23, retrieved from https://www.graphics.rwth-aachen.de/publication/105/pointsl.pdf.

Lottes, T., "FXAA," NVIDIA, White paper, Feb. 2009, 15 pages, retrieved from https://developer.download.nvidia.com/assets/gamedev/files/sdk/11/FXAA_WhitePaper.pdf.

Olano et al., "LEAN Mapping," Proceedings of the 2010 ACM SIGGRAPH symposium on Interactive 3D Graphics and Games (I3D '10), Feb. 2010, 8 pages, retrieved from http://citeseerx.ist.psu.edu/viewdoc/download?doi=10.1.1.227.6960&rep=rep1&type=pdf.

Reshetov, A., "Morphological Antialiasing," Proceedings of the Conference on High Performance Graphics (HPG 09), Aug. 2009, pp. 109-116.

Salvi, M., "Anti-Aliasing: Are We There Yet?" NVIDIA, Presented at SIGGRAPH, PowerPoint Presentation, 2015, pp. 1-46.

Salvi et al., "Surface Based Anti-Aliasing," Proceedings of the ACM SIGGRAPH Symposium on Interactive 3D Graphics and Games, Mar. 2012, 6 pages, retrieved from http://vidimce.org/publications/sbaa/sbaa_i3d2012.pdf.

Wang et al., "Decoupled Coverage Anti-Aliasing," ACM / EG Symposium on High Performance Graphics, Aug. 1, 2015, 10 pages, retrieved from https://research.nvidia.com/publication/decoupled-coverage-anti-aliasing.

Whitted, T., "An Improved Illumination Model for Shaded Display," Graphics and Image Processing, Communications of the ACM, vol. 23, No. 6, Jun. 1980, pp. 343-349.

Pettineo, M., "Rendering the Alternate History of the Order: 1886," Presented at SIGGRAPH 2015, Advances in Realtime Rendering in

(56) References Cited

OTHER PUBLICATIONS

Games, PowerPoint Presentation, Aug. 2015, 71 pages, retrieved from https://mynameismjp.wordpress.com/publications/.
Pedersen, L., "Temporal Reprojection Anti-Aliasing in INSIDE," GDC30, 2016, 47 pages, retrieved from http://twvideo01.ubm-us.net/o1/vault/gdc2016/Presentations/Pedersen_LasseJonFuglsang_TemporalReprojectionAntiAliasing.pdf.

* cited by examiner

ADDING GREATER REALISM TO A COMPUTER-GENERATED IMAGE BY SMOOTHING JAGGED EDGES

CLAIM OF PRIORITY

This application claims the benefit of U.S. Provisional Application No. 62/656,951 titled "Adaptive Temporal and Hybrid Deferred Anti-Aliasing for GPU Ray-Tracing," filed Apr. 12, 2018, the entire contents of which is incorporated herein by reference. Additionally, this application claims the benefit of U.S. Provisional Application No. 62/659,620 titled "ADAPTIVE RAY TRACING FOR TEMPORAL ANTIALIASING," filed Apr. 18, 2018, the entire contents of which is incorporated herein by reference.

FIELD OF THE INVENTION

The present invention relates to image rendering, and more particularly to performing anti-aliasing during image rendering.

BACKGROUND

Anti-aliasing is commonly used during the rendering of a scene to remove image artifacts that result from inadequate sampling rates. However, current methods for performing anti-aliasing incur high storage costs and may suffer from high bandwidth usage in certain situations. Additionally, current techniques for performing anti-aliased deferred rendering of complex geometry using graphics hardware may be complicated, and may require several rendering passes over a scene.

DETAILED DESCRIPTION

In computer graphics, anti-aliasing is a technique used to add greater realism to a digital image by smoothing jagged edges (e.g., on curved lines and diagonals, etc.). These jagged edges may appear as a result of low sampling rates during the rendering of the image. However, it takes a lot of processing resources and time to perform anti-aliasing. In response, specific pixels in the digital image where antialiasing would be helpful are specifically identified, and antialiasing is then performed on these identified pixels. This reduces a cost of performing antialiasing by reducing a number of pixels within an image on which antialiasing is performed.

Figure 1:
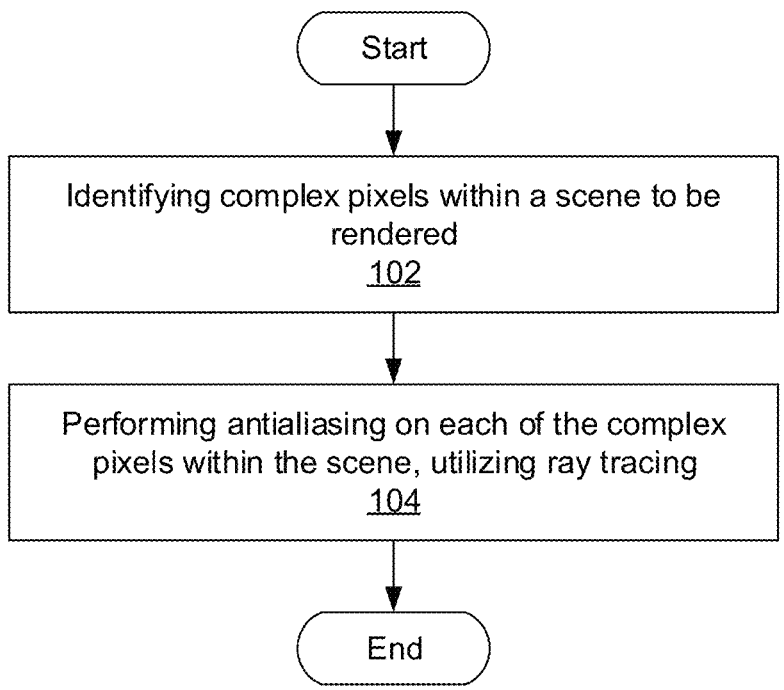
FIG. 1 illustrates a flowchart of a method for performing complex pixel identification for improving an anti-aliasing of computer-generated images, in accordance with an embodiment.

FIG. 1 illustrates a flowchart of a method 100 for performing complex pixel identification for improving an anti-aliasing of computer-generated images, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of performing parallel path space filtering by hashing. Furthermore, persons of ordinary skill in the art will understand that any system that performs method 100 is within the scope and spirit of embodiments of the present invention.

As shown in operation 102, complex pixels within a scene to be rendered are identified. In one embodiment, the complex pixels may each include a pixel that contains one or more discontinuities of attributes of the pixel (e.g. coverage, depth, material etc.) that lead to aliasing. In another embodiment, the complex pixels may each include visible pixels that are partially covered by one or more instances of geometry (e.g., one or more polygons, etc.) within the scene.

Additionally, in one embodiment, the complex pixels may be identified utilizing conservative rasterization. For example, conservative rasterization may identify an intersection of one or more instances of geometry with any portion of a pixel within the scene, even if the geometry doesn't hit a pixel center or any of samples within the pixel (if using multiple samples). In another example, conservative rasterization may identify one or more non-zero intersections between an instance of geometry and a pixel, and may rasterize the pixel.

Further, in one embodiment, the conservative rasterization may be implemented over a plurality of passes of the one or more instances of geometry within the scene. For example, a first pass of the conservative rasterization may include a depth pre-pass. For instance, the depth pre-pass may create a depth buffer that stores depths for nearest fully covered pixels.

Further still, in one embodiment, a second pass of the conservative rasterization may include a pixel identification pass. For example, the pixel identification pass may identify and mark the complex pixels (e.g., the visible pixels within the scene that are partially covered by one or more instances of geometry). In another example, the pixels may be marked utilizing an implemented pixel shader. In yet another example, the pixel identification pass may also increment a counter.

Also, in one embodiment, the pixel identification pass may also count, for each pixel, a number of instances of geometry that touch the pixel. This may be stored as a primitive count for the pixel. In another embodiment, the pixel identification pass may result in a 2D surface that contains non-zero values for the complex pixels, where the non-zero values may indicate a number of primitives that are potentially visible in the pixel.

In this way, pixels within a scene that merit a higher rate of sampling (e.g., partially covered pixels, etc.) may be identified during anti-aliasing, using conservative rasterization.

In addition, in one embodiment, the conservative rasterization may include inner-conservative rasterization. For example, inner-conservative rasterization may analyze the one or more instances of geometry within the scene, and may indicate, for each pixel of the scene, whether the one or more instances of geometry cover at least a portion of the pixel, and whether the pixel is covered entirely. In another example, complete coverage of a pixel may be indicated by a flag associated with the pixel. For instance, a binary flag value of 0 may indicate that the associated pixel is partially covered, and a binary flag value of 1 may indicate that the associated pixel is fully covered.

Furthermore, as shown in operation 104, antialiasing is performed on each of the complex pixels within the scene, utilizing ray tracing. In one embodiment, performing the antialiasing may include performing ray tracing on the complex pixels within the scene. For example, performing the antialiasing may include determining point-sampling visibility for a sub-pixel area within each of the complex pixels, utilizing GPU ray tracing. This may include sampling an area of the complex pixel via ray tracing, and approximating a geometry coverage of the complex pixel.

For example, the rays may be distributed across the complex pixels, based on the primitive count for each complex pixel. In another example, more rays may be traced through a complex pixel that has a larger pixel count than a complex pixel with a smaller pixel count. This may be performed utilizing a ray tracing framework/engine.

Further still, in one embodiment, performing the antialiasing may include, for each of the complex pixels, analytically solving a geometry surface and its coverage of the complex pixel. For example, performing the antialiasing may include storing additional data about the geometry intersecting the complex pixel. For instance, the additional data may include one or more edge equations. In another example, performing the antialiasing may include utilizing the additional data to compute edge/ray intersections. This may be performed by a GPU without using a ray tracing framework/engine.

Also, in one embodiment, performing the antialiasing may include evaluating visibility analytically. For example, analytic visibility may indicate how much of an area of a complex pixel is occupied with a specific primitive (e.g., by solving a surface integral, etc.).

In this way, pixels within a scene that merit a higher rate of sampling (e.g., partially covered pixels, etc.) during anti-aliasing may be identified. As a result, a sampling cost may be reduced during anti-aliasing by focusing sampling within pixels that have a primitive only partially covering the pixel. Additionally, during anti-aliasing, a number of samples sent to each pixel may be adjusted on a per-pixel basis, utilizing ray tracing.

Figure 2:
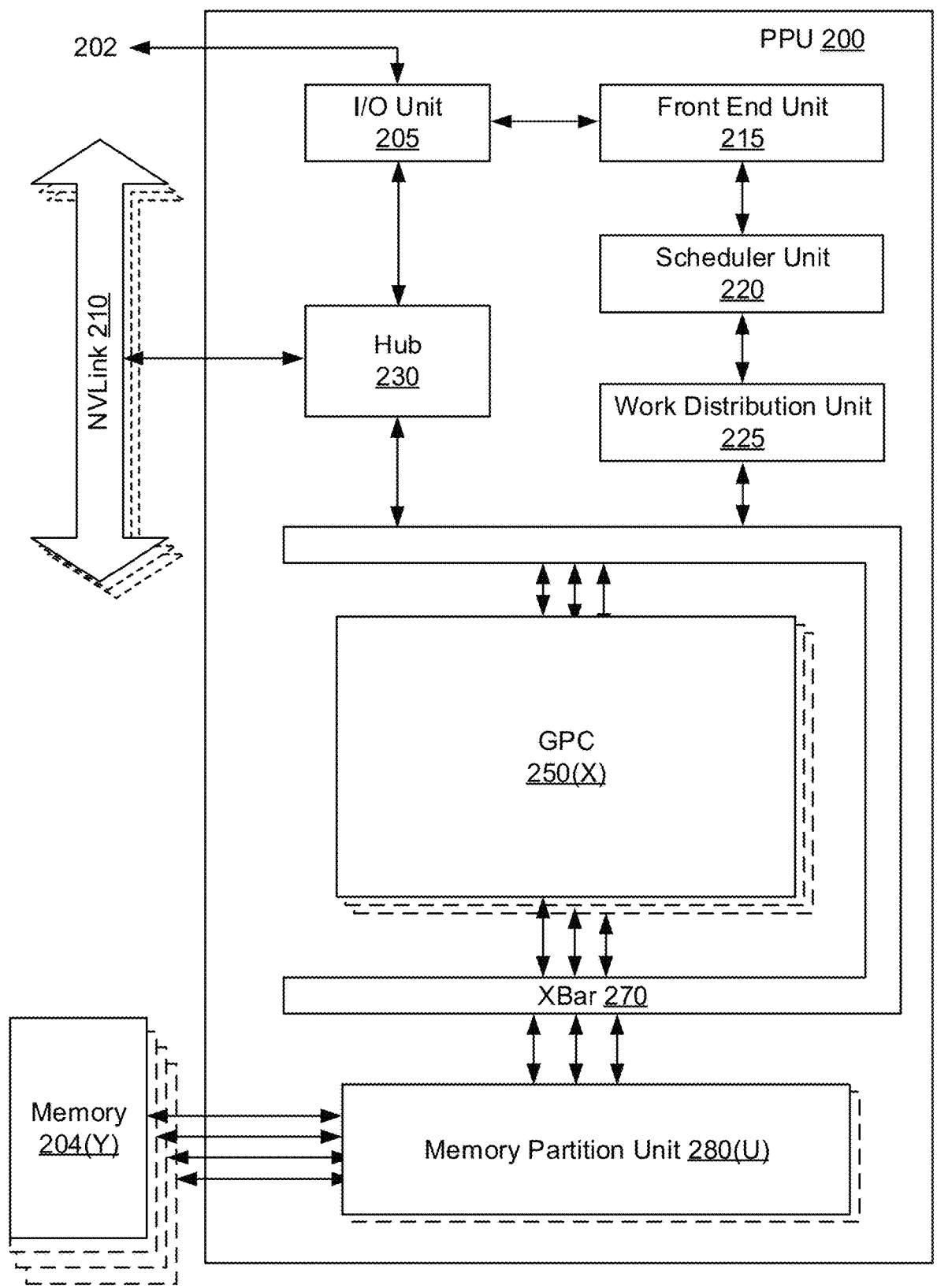
FIG. 2 illustrates a parallel processing unit, in accordance with an embodiment.

In yet another embodiment, antialiasing is performed on each of the complex pixels within the scene utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
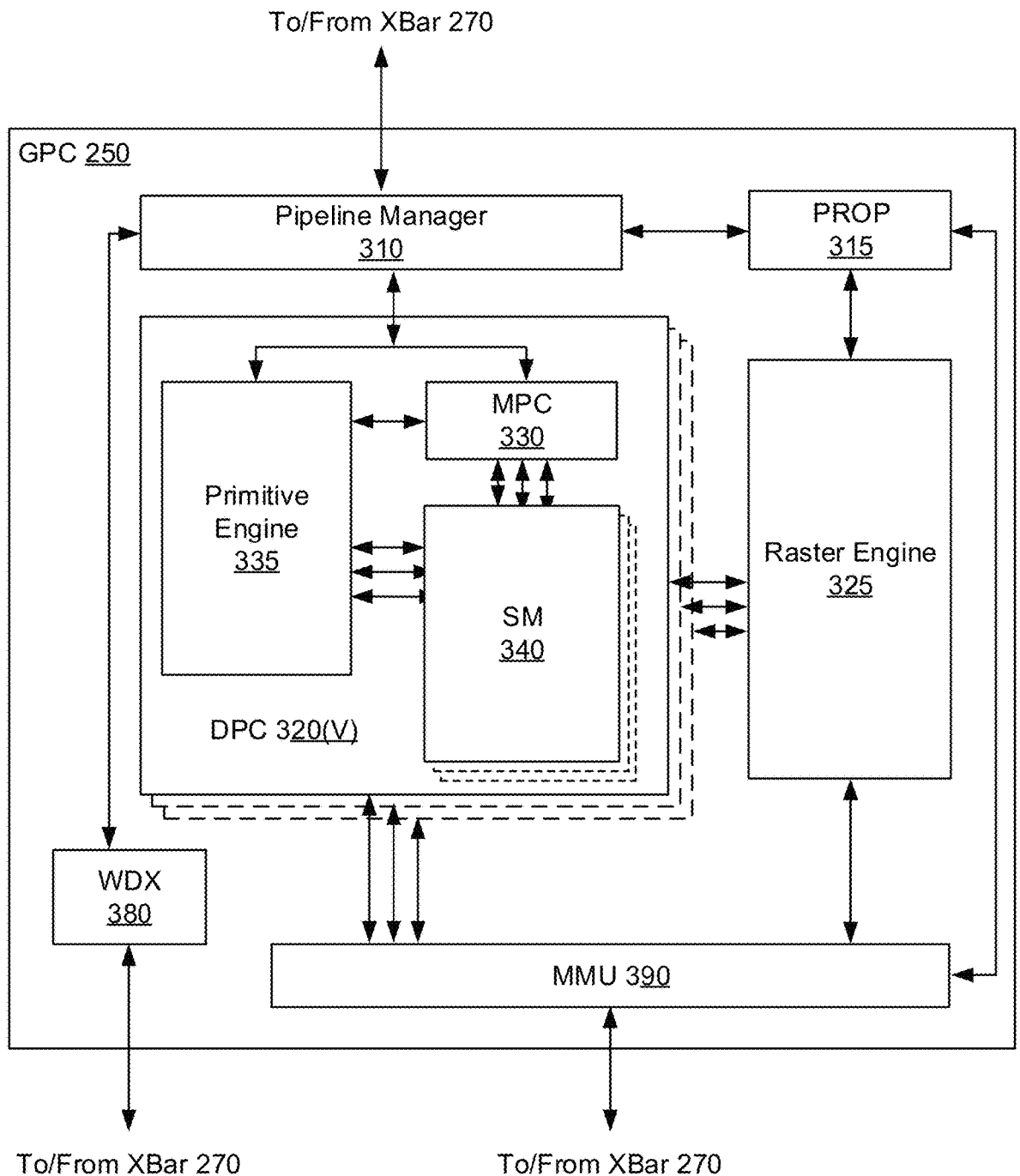
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
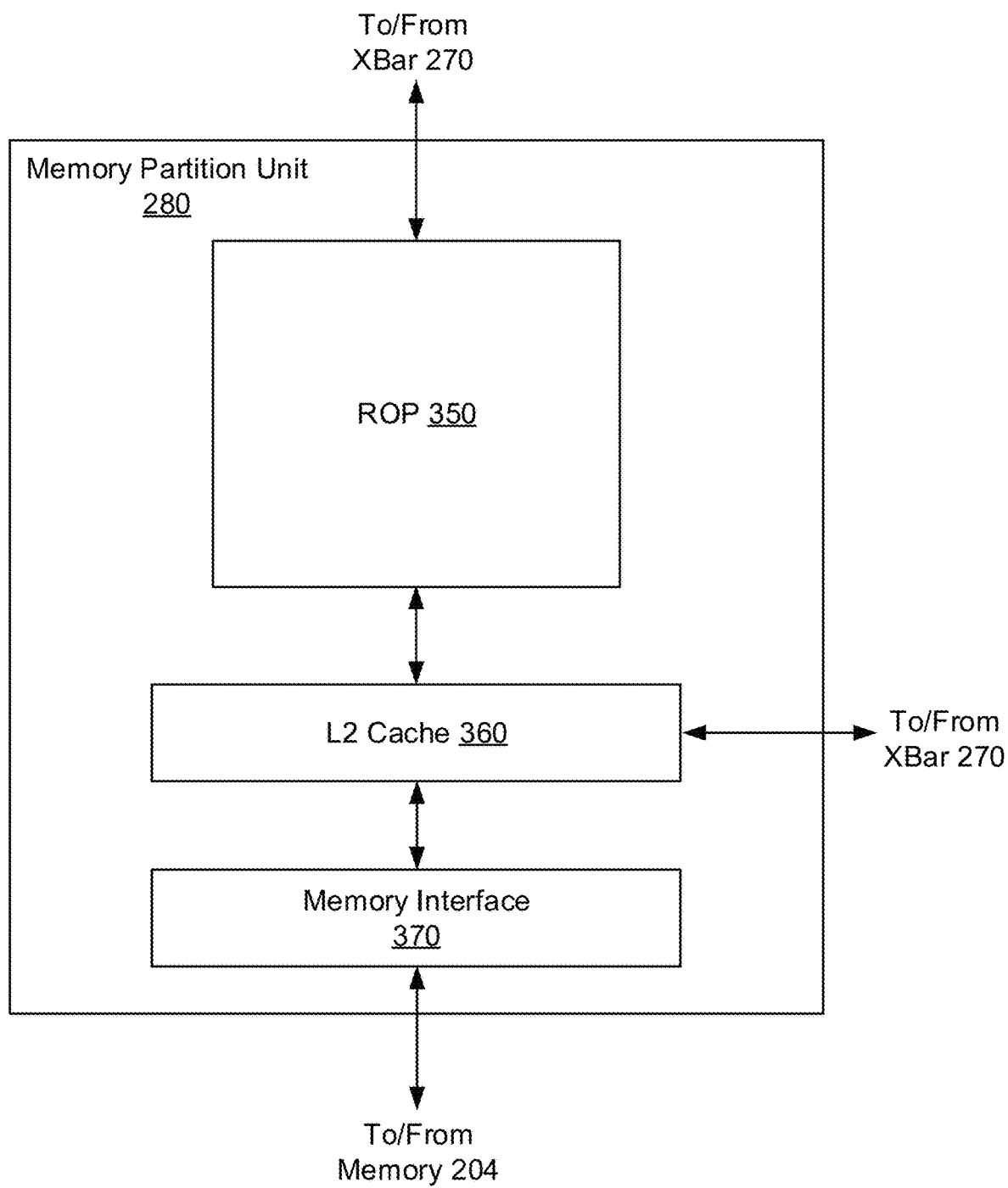
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
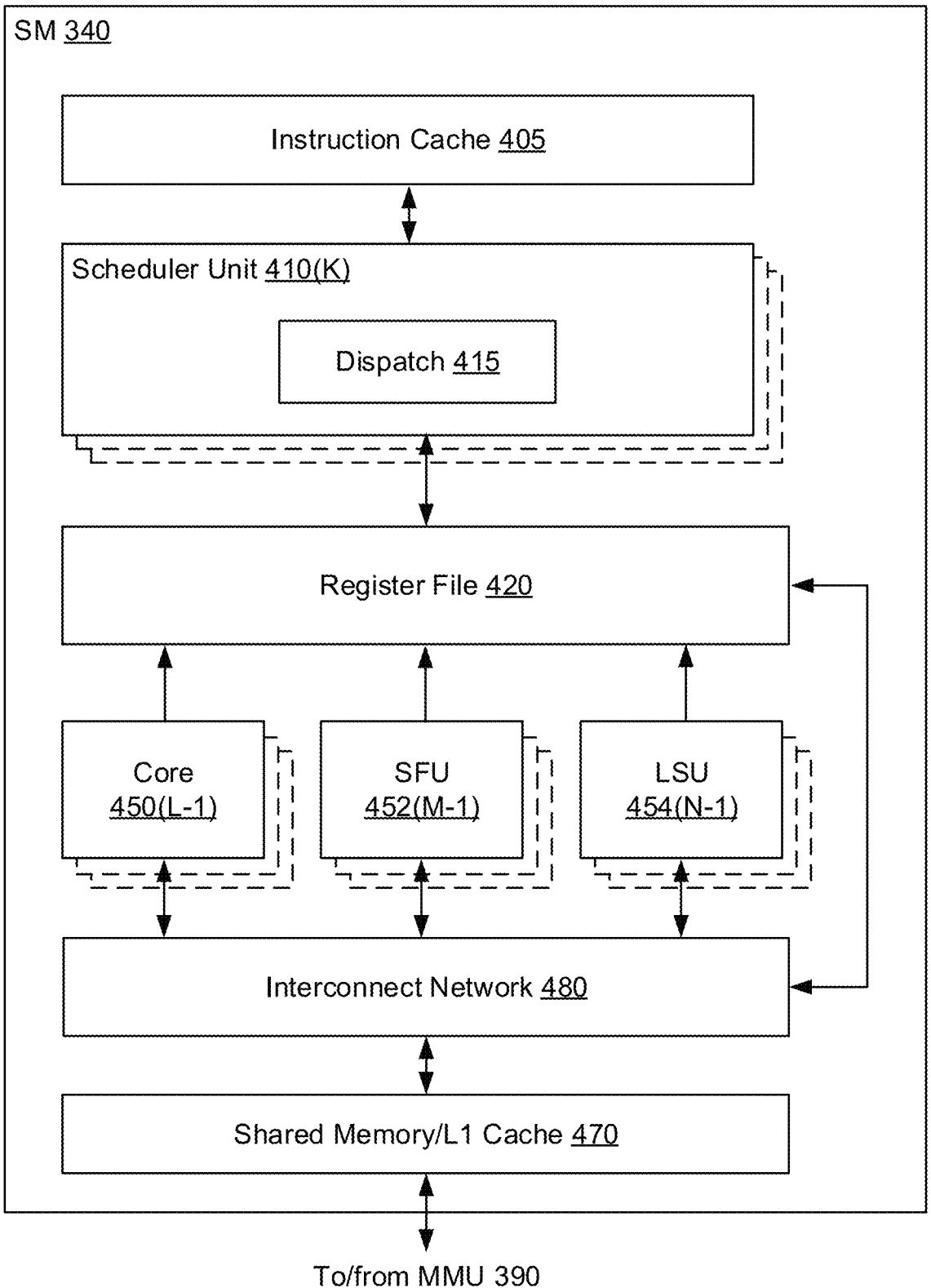
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
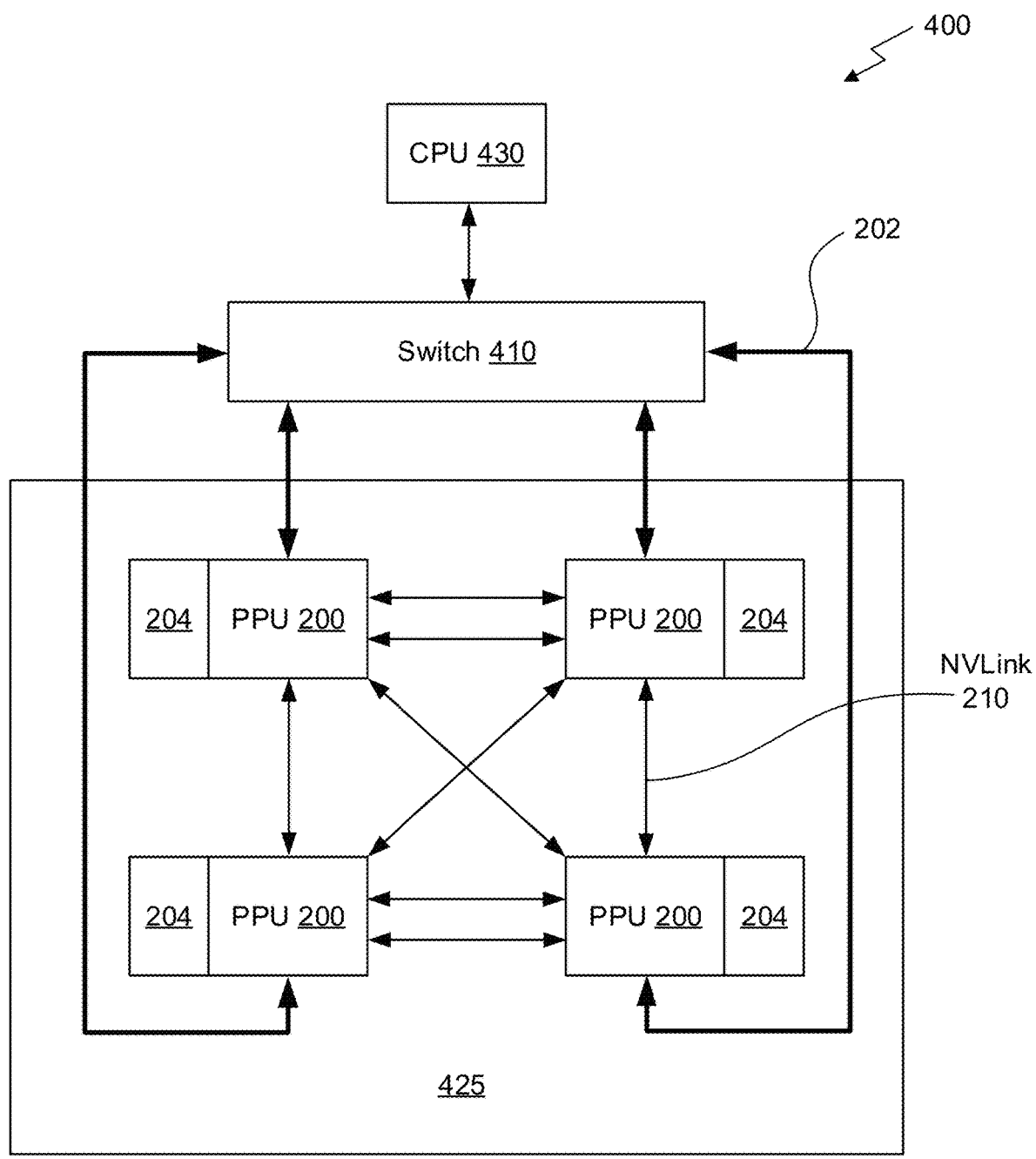
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
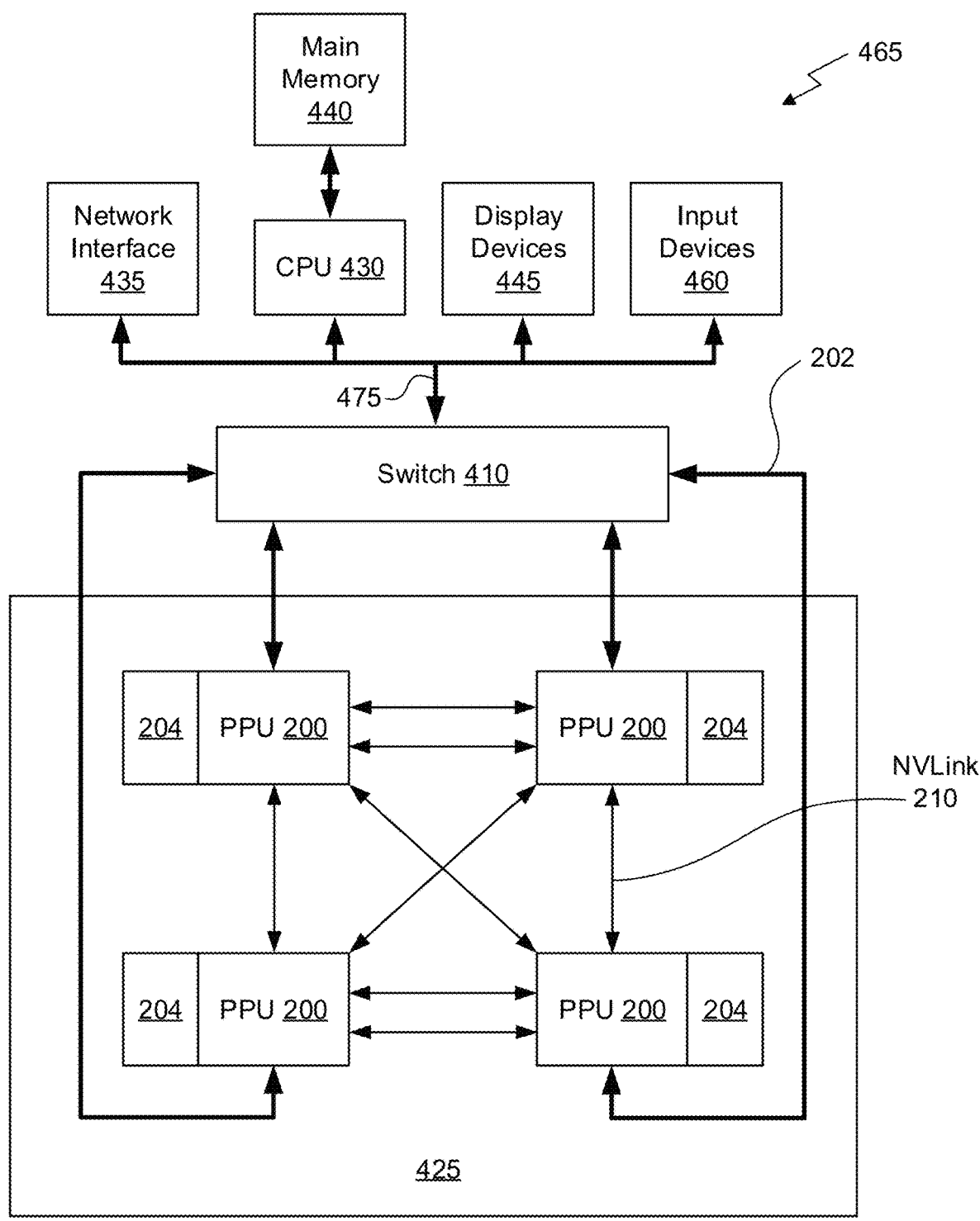
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In an embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 5:
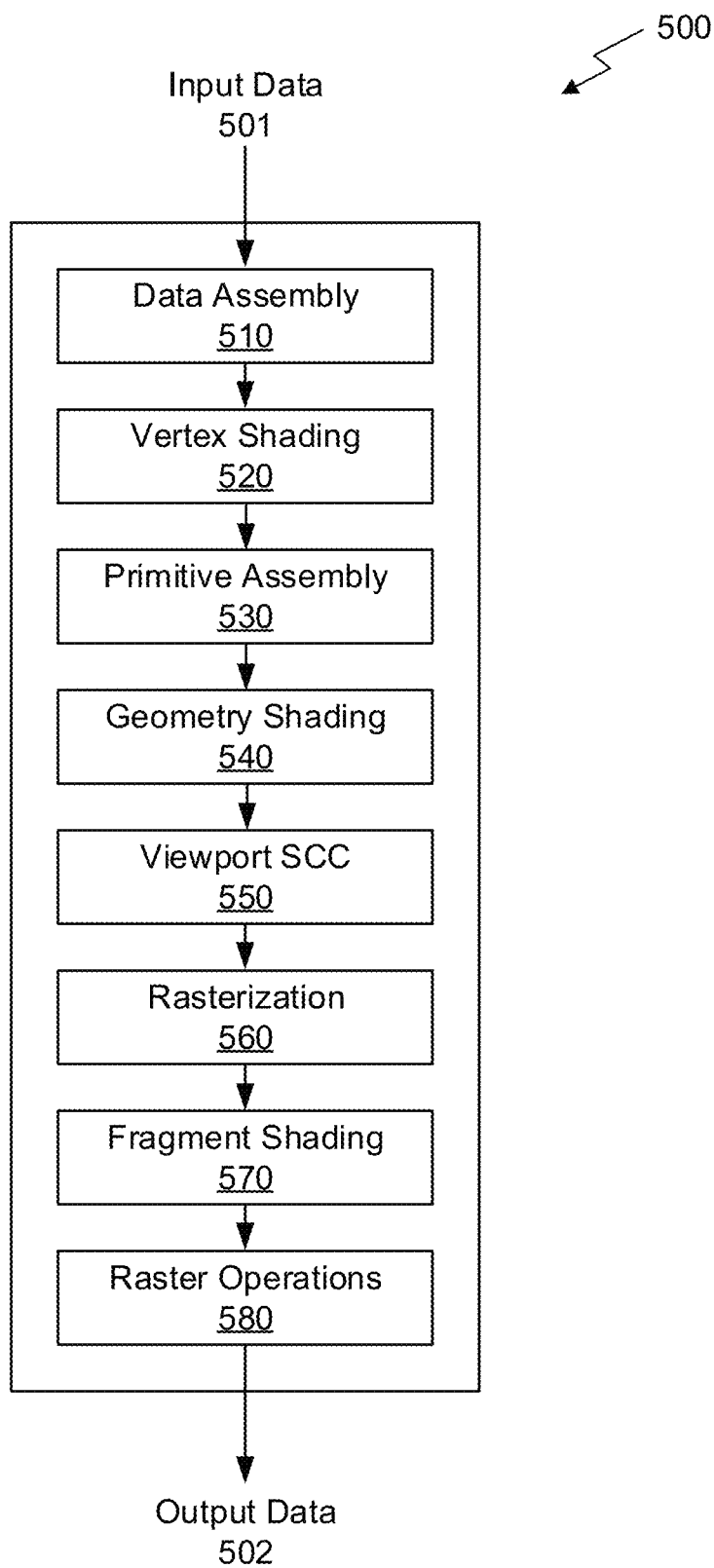
FIG. 5 is a conceptual diagram of a graphics processing pipeline implemented by the PPU of FIG. 2, in accordance with an embodiment.

FIG. 5 is a conceptual diagram of a graphics processing pipeline 500 implemented by the PPU 200 of FIG. 2, in accordance with an embodiment. The graphics processing pipeline 500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 500 receives input data 501 that is transmitted from one stage to the next stage of the graphics processing pipeline 500 to generate output data 502. In an embodiment, the graphics processing pipeline 500 may represent a graphics processing pipeline defined by the OpenGL® API. As an option, the graphics processing pipeline 500 may be implemented in the context of the functionality and architecture of the previous Figures and/or any subsequent Figure(s).

As shown in FIG. 5, the graphics processing pipeline 500 comprises a pipeline architecture that includes a number of stages. The stages include, but are not limited to, a data assembly stage 510, a vertex shading stage 520, a primitive assembly stage 530, a geometry shading stage 540, a viewport scale, cull, and clip (VSCC) stage 550, a rasterization stage 560, a fragment shading stage 570, and a raster operations stage 580. In an embodiment, the input data 501 comprises commands that configure the processing units to implement the stages of the graphics processing pipeline 500 and geometric primitives (e.g., points, lines, triangles, quads, triangle strips or fans, etc.) to be processed by the stages. The output data 502 may comprise pixel data (i.e., color data) that is copied into a frame buffer or other type of surface data structure in a memory.

The data assembly stage 510 receives the input data 501 that specifies vertex data for high-order surfaces, primitives, or the like. The data assembly stage 510 collects the vertex data in a temporary storage or queue, such as by receiving a command from the host processor that includes a pointer to a buffer in memory and reading the vertex data from the buffer. The vertex data is then transmitted to the vertex shading stage 520 for processing.

The vertex shading stage 520 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 520 may manipulate individual vertex attributes such as position, color, texture coordinates, and the like. In other words, the vertex shading stage 520 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 520 generates transformed vertex data that is transmitted to the primitive assembly stage 530.

The primitive assembly stage 530 collects vertices output by the vertex shading stage 520 and groups the vertices into geometric primitives for processing by the geometry shading stage 540. For example, the primitive assembly stage 530 may be configured to group every three consecutive vertices as a geometric primitive (i.e., a triangle) for transmission to the geometry shading stage 540. In some embodiments, specific vertices may be reused for consecutive geometric primitives (e.g., two consecutive triangles in a triangle strip may share two vertices). The primitive assembly stage 530 transmits geometric primitives (i.e., a collection of associated vertices) to the geometry shading stage 540.

The geometry shading stage 540 processes geometric primitives by performing a set of operations (i.e., a geometry shader or program) on the geometric primitives. Tessellation operations may generate one or more geometric primitives from each geometric primitive. In other words, the geometry shading stage 540 may subdivide each geometric primitive into a finer mesh of two or more geometric primitives for processing by the rest of the graphics processing pipeline 500. The geometry shading stage 540 transmits geometric primitives to the viewport SCC stage 550.

In an embodiment, the graphics processing pipeline 500 may operate within a streaming multiprocessor and the vertex shading stage 520, the primitive assembly stage 530, the geometry shading stage 540, the fragment shading stage 570, and/or hardware/software associated therewith, may sequentially perform processing operations. Once the sequential processing operations are complete, in an embodiment, the viewport SCC stage 550 may utilize the data. In an embodiment, primitive data processed by one or more of the stages in the graphics processing pipeline 500 may be written to a cache (e.g. L1 cache, a vertex cache, etc.). In this case, in an embodiment, the viewport SCC stage 550 may access the data in the cache. In an embodiment, the viewport SCC stage 550 and the rasterization stage 560 are implemented as fixed function circuitry.

The viewport SCC stage 550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 560.

The rasterization stage 560 converts the 3D geometric primitives into 2D fragments (e.g. capable of being utilized for display, etc.). The rasterization stage 560 may be configured to utilize the vertices of the geometric primitives to setup a set of plane equations from which various attributes can be interpolated. The rasterization stage 560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 560 generates fragment data (i.e., interpolated vertex attributes associated with a particular sample location for each covered pixel) that are transmitted to the fragment shading stage 570.

The fragment shading stage 570 processes fragment data by performing a set of operations (i.e., a fragment shader or a program) on each of the fragments. The fragment shading stage 570 may generate pixel data (i.e., color values) for the fragment such as by performing lighting operations or sampling texture maps using interpolated texture coordinates for the fragment. The fragment shading stage 570 generates pixel data that is transmitted to the raster operations stage 580.

The raster operations stage 580 may perform various operations on the pixel data such as performing alpha tests, stencil tests, and blending the pixel data with other pixel data corresponding to other fragments associated with the pixel. When the raster operations stage 580 has finished processing the pixel data (i.e., the output data 502), the pixel data may be written to a render target such as a frame buffer, a color buffer, or the like.

It will be appreciated that one or more additional stages may be included in the graphics processing pipeline 500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 540).

Other types of graphics processing pipelines are contemplated as being within the scope of the present disclosure. Furthermore, any of the stages of the graphics processing pipeline 500 may be implemented by one or more dedicated hardware units within a graphics processor such as PPU 200. Other stages of the graphics processing pipeline 500 may be implemented by programmable hardware units such as the SM 340 of the PPU 200.

The graphics processing pipeline 500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU. In other instances, the device driver may perform operations, at least in part, by launching operations on the PPU 200 utilizing an input/output interface between the CPU and the PPU 200. In an embodiment, the device driver is configured to implement the graphics processing pipeline 500 utilizing the hardware of the PPU 200.

Various programs may be executed within the PPU 200 in order to implement the various stages of the graphics processing pipeline 500. For example, the device driver may launch a kernel on the PPU 200 to perform the vertex shading stage 520 on one SM 340 (or multiple SMs 340). The device driver (or the initial kernel executed by the PPU 300) may also launch other kernels on the PPU 300 to perform other stages of the graphics processing pipeline 500, such as the geometry shading stage 540 and the fragment shading stage 570. In addition, some of the stages of the graphics processing pipeline 500 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 340.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Hybrid Deferred Ray-Traced Anti-Aliasing

In one embodiment, antialiasing may be performed on identified complex pixels as part of anti-aliased deferred rendering for a scene. This may be performed by implementing hybrid deferred ray-traced antialiasing for the scene.

Figure 6:
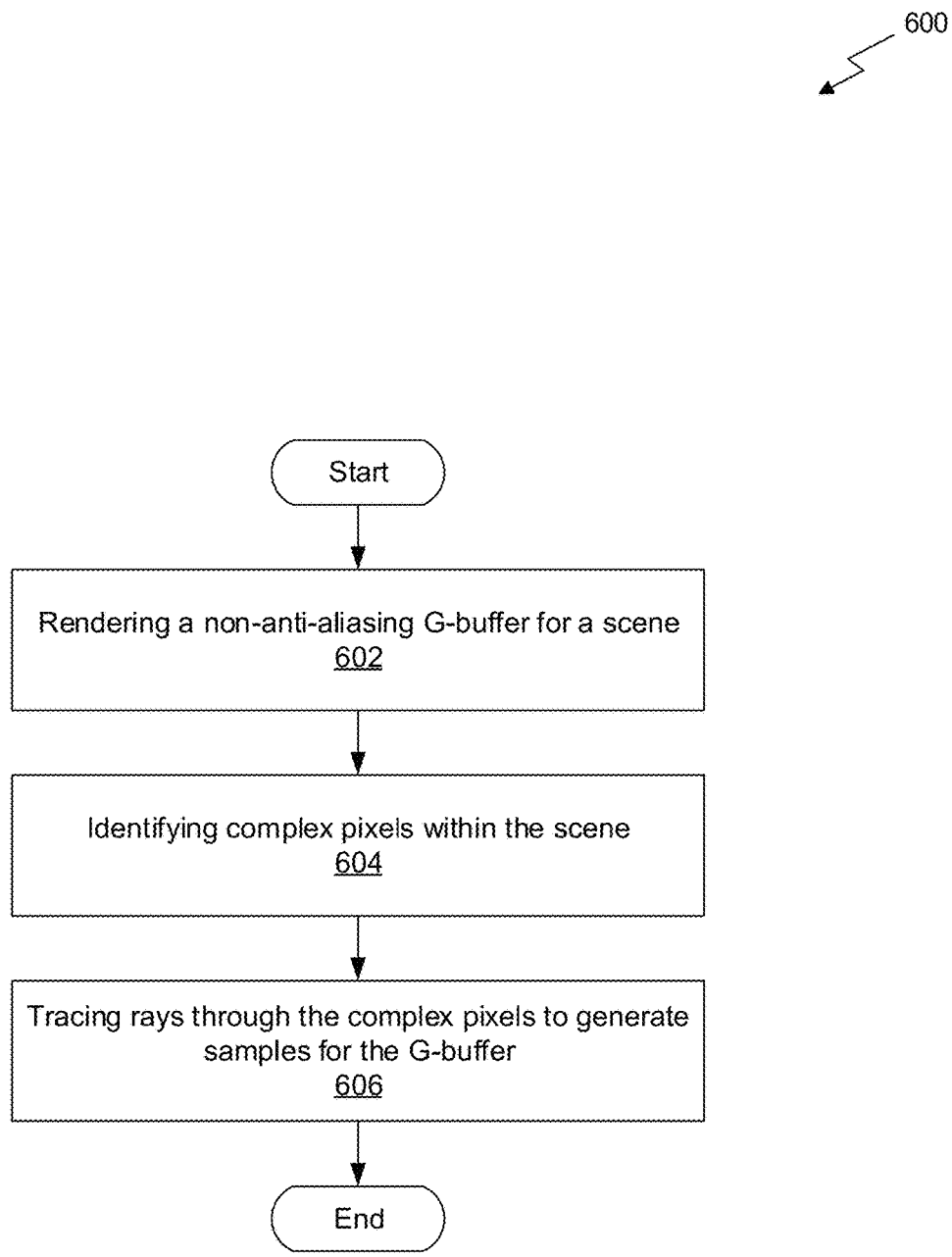
FIG. 6 illustrates a flowchart of a method for performing hybrid deferred ray-traced anti-aliasing, in accordance with one embodiment.

FIG. 6 illustrates a flowchart of a method 600 for performing hybrid deferred ray-traced anti-aliasing, in accordance with an embodiment. Although method 600 is described in the context of a processing unit, the method 600 may also be performed by a program, custom circuitry, or by a combination of custom circuitry and a program. For example, the method 600 may be executed by a GPU (graphics processing unit), CPU (central processing unit), or any processor capable of performing parallel path space filtering by hashing. Furthermore, persons of ordinary skill in the art will understand that any system that performs method 600 is within the scope and spirit of embodiments of the present invention.

As shown in operation 602, a non-anti-aliasing G-buffer is rendered for a scene. For example, the G-buffer may include a buffer that stores information about scene geometry at every pixel. In another example, a multi-sample anti-aliasing (MSAA) depth buffer may be rendered using target independent rasterization (TIR). In yet another example, MSAA normals may be rendered using TIR.

Further, as shown in operation 604, complex pixels are identified within the scene. For example, the complex pixels may include pixels that surround one or more discontinuities (e.g., depth, brightness, etc.) within the scene. In another example, identifying complex pixels within the scene may utilize rendered MSAA depth and/or MSAA normals.

Further still, as shown in operation 606, rays are traced through the complex pixels to generate samples for the G-buffer. For example, storage may be allocated for a predetermined number of G-buffer data for the complex pixels. In another example, a predetermined number of rays may be traced through each complex pixel. In yet another example, G-buffer data may be recorded for nearest hits. In still another example, additional rays may be iteratively traced after receiving results. In another example, light ray hits may be computed for complex pixels during deferred lighting.

In yet another embodiment, the rays may be traced utilizing a parallel processing unit (PPU) such as the PPU 200 illustrated in FIG. 2.

In this way, deferred ray-traced anti-aliasing may be performed utilizing a single rasterizing pass over the scene. Additionally, anti-aliasing may therefore be performed by combining single-pass deferred GPU rasterization and GPU ray tracing.

Adaptive Ray Tracing for Temporal Antialiasing

Temporal antialiasing (TAA) algorithms are widely used in video games today. However, current TAA implementations are limited in that, when it is identified that a particular pixel has diverged from the right value during TAA, there is no efficient and effective approach to color that pixel accurately (only heuristics that often fall apart depending on the root cause of sampling problems).

Figure 7:
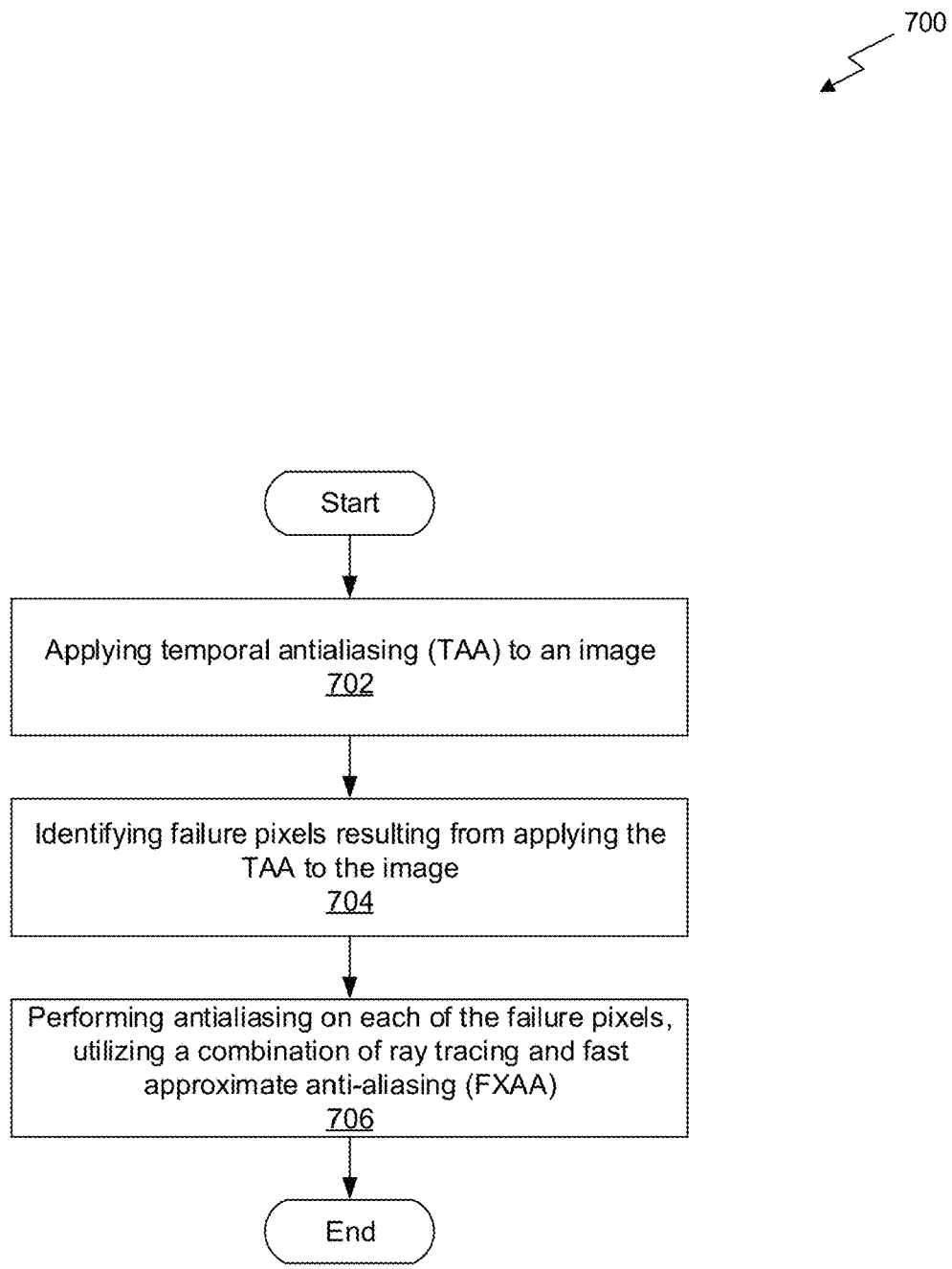
FIG. 7 illustrates a flowchart of a method for performing adaptive ray tracing for temporal antialiasing, in accordance with one embodiment.

FIG. 7 illustrates a flowchart of a method 700 for performing adaptive ray tracing for temporal antialiasing, in accordance with an embodiment. Although method 700 is described in the context of a processing unit, the method 700 may also be performed by a program, custom circuitry, or by a combination of custom circuitry and a program. For example, the method 700 may be executed by a GPU (graphics processing unit), CPU (central processing unit), or any processor capable of performing parallel path space filtering by hashing. Furthermore, persons of ordinary skill in the art will understand that any system that performs method 700 is within the scope and spirit of embodiments of the present invention.

As shown in operation 702, temporal antialiasing (TAA) is applied to an image. In one embodiment, the image may be one of a series of rasterized images. In another embodiment, the image may be created utilizing one or more rendering techniques. For example, the image may be created utilizing forward or deferred rasterization, ray tracing, point-based rendering, image-based rendering, etc.

Additionally, in one embodiment, TAA may be applied to the image to remove the effects of aliasing (e.g., geometric aliasing, temporal aliasing, specular aliasing, etc.) within the rasterized image. For example, TAA may attempt to correct aliasing of primary visible surfaces within the rasterized image. In another embodiment, the results of applying TAA to the rasterized image may include a color buffer for pixels within the rasterized image.

Further, as shown in operation 704, failure pixels resulting from applying the TAA to the image are identified. In one embodiment, the failure pixels may include pixels within the image for which the TAA has failed. In another embodiment, the failure pixels may be identified during the TAA. For example, the TAA may compare an historical value for a pixel in a previous frame to current values of neighboring pixels in a current frame. In another example, pixels with an historical value that differs from the current values of neighboring pixels by more than a predetermined amount may be identified as failure pixels. In this way, the pixel may be identified as complex and may be labeled as a failure pixel.

Further still, in one embodiment, the failure pixels may be identified by comparing a depth value for a pixel to depth values for neighboring pixels. For example, the pixel may be identified as a failure pixel in response to determining that the depth value for the pixel differs from depth values for neighboring pixels by more than a predetermined amount. In this way, the pixel may be identified as being associated with a depth edge and may be labeled as a failure pixel.

Also, in one embodiment, the failure pixels may be identified by comparing a luminance value for a pixel to luminance values for neighboring pixels. For example, the pixel may be identified as a failure pixel in response to determining that the luminance value for the pixel differs from luminance values for neighboring pixels by more than a predetermined amount. In another embodiment, the failure pixels may be marked (e.g., using a sentinel value, etc.). In yet another embodiment, the failure pixels may be included within a segmentation mask.

In addition, as shown in operation 706, anti-aliasing is performed on each of the failure pixels, utilizing a combination of ray tracing (e.g., GPU optimized ray tracing) and fast approximate anti-aliasing (FXAA). In one embodiment, the ray tracing may perform supersampling. In another embodiment, performing the antialiasing may include tracing a plurality of rays through each of the failure pixels. For example, performing the antialiasing may include determining point-sampling visibility for a sub-pixel area within each of the failure pixels, utilizing GPU ray tracing.

Furthermore, in one embodiment, performing the antialiasing may include, for each of the failure pixels, analytically solving a geometry surface and its coverage of the failure pixel. In another embodiment, performing the antialiasing may include evaluating visibility analytically. In yet another embodiment, performing the antialiasing may result in a ray-traced antialiasing texture for each of the failure pixels.

Further still, the results of performing the antialiasing on the failure pixels (e.g., textures for a first set of antialiased pixels) may be combined with the results of applying the TAA to the image (e.g., a color buffer for a second set of antialiased pixels) to create an output image. For example, the antialiasing texture results of performing the antialiasing on the failure pixels may be blended with a color buffer resulting from applying the TAA to the image.

In this way, pixels in an image for which antialiasing has failed using TAA may be antialiased utilizing GPU ray tracing, and the results may be combined. This may completely resolve problems with TAA (e.g., blurring, ghosting, etc.) while amortizing the cost of ray tracing within the rasterized image.

Also, in one embodiment, one or more pixels associated with disocclusions within the original image may be identified. For example, the identified pixels may include pixels for which no temporal information exists (e.g., data is unavailable in the current frame due to occlusion and/or temporal data for the pixels is not available from a previous image.). In one embodiment, these pixels may be identified by identifying one or more motion vector failures associated with the pixels. In another embodiment, antialiasing may be performed on these pixels, utilizing fast approximate anti-aliasing (FXAA). For example, FXAA may filter color image values for these pixels based on the degree to which the pixels are marked as an edge.

Additionally, in one embodiment, the pixels associated with disocclusions may be included within a segmentation mask. In another embodiment, the segmentation mask including these pixels may be separate from the segmentation mask including the failure pixels. In yet another embodiment, the results of performing the antialiasing on the failure pixels (e.g., a first set of antialiased pixels) may be combined with the results of applying the TAA to the original image (e.g., a second set of antialiased pixels) and the results of performing the antialiasing on the pixels associated with disocclusions (e.g., a third set of antialiased pixels) to create an output image.

In one embodiment, a renderer may be used to generate a rasterized image. Additionally, antialiasing may be applied to the rasterized image utilizing TAA. Further, pixels for which antialiasing has failed using TAA may be identified and marked, and TAA results may be discarded for these pixels. Further still, antialiasing may be applied to the marked pixels, utilizing supersampled GPU ray tracing, to create ray-traced antialiasing texture results. Also, the ray-traced antialiasing texture results may be blended with the color buffer created utilizing TAA.

In yet another embodiment, anti-aliasing may be performed utilizing a parallel processing unit (PPU) such as the PPU 200 illustrated in FIG. 2.

In this way, pixels for which TAA has failed may be identified, and AA may be performed on those pixels utilizing a combination of ray tracing and FXAA, to improve AA results. Additionally, a cost of the ray tracing may be amortized by selectively applying it to failed results of TAA. Further, cheaper, efficient AA may be performed on pixels where no temporal information exists, utilizing FXAA. Further still, AA may be performed within a single image in a selective and intelligent manner utilizing TAA, ray tracing, and FXAA.

Adaptive Temporal and Hybrid Deferred Anti-Aliasing for GPU Ray-Tracing

Anti-aliasing is a category of techniques used to remove image artifacts that result from inadequate sampling rates. Multi-sample Anti-Aliasing (MSAA) is a popular anti-aliasing technique that samples visibility at a different rate from the typical shading rate of once per pixel per primitive. Although somewhat effective in geometric anti-aliasing, MSAA incurs higher storage costs due to storing depth and color samples at the sampling rate. Additionally, it can suffer from higher bandwidth usage in situations where color compression fails to compress the color data well. As such, the high image quality produced by the application of MSAA incurs a relatively high cost.

The image quality of MSAA is desirable without paying the high associated cost. When a primitive covers a pixel entirely, it is not necessary to do further visibility calculations. When a pixel is partially covered by primitive(s), how much of the pixel is covered by each intersecting primitive needs to be determined to calculate correct visibility. Taking advantage of this knowledge, embodiments of the present invention include an approach that identifies "complex" pixels—pixels that would benefit from computing visibility more accurately than a single raster sample and/or pixels containing depth or other discontinuities that lead to aliasing. Additional embodiments of the invention provide methods to compute visibility for the identified pixels with improved accuracy.

Pixel Classification Using Conservative Rasterization

Complex pixels as described herein can be identified by analyzing the depth and/or primitive ID buffers; however, this approach may miss thin geometric features. Common problem cases are cable wires or fences at a distance that are not sampled sufficiently by standard rasterization. Embodiments of the present invention are able to avoid using multiple sub-pixel samples during pixel classification by employing Conservative Rasterization.

GPU hardware support for Conservative Rasterization typically refers to a rasterization mode in which pixels partially covered by the primitive are rasterized. There are different tiers of this feature. At the Tier 3 level, one can (optionally) pass in a system variable called SV_InnerCoverage, whose least significant bit (LSB) is set to 1 when that pixel is guaranteed to be fully covered by the primitive.

Exemplary Algorithm

Using a Tier 3 (or similar) conservative rasterizer, preferred embodiments implement the following process for identifying pixels that can benefit from a more accurate visibility computation.

Pass 1: Depth Pre Pass

From this pass, a depth buffer is generated that stores depths for nearest fully covered pixels. According to preferred embodiments, the depth pre-pass may be performed according to the following steps:
1. Enable conservative rasterization and enable the depth test for read and write.
2. A pixel shader accepts SV_InnerCoverage as an input. It checks this value to find which pixels are fully covered by the primitive and discards the pixels that are not fully covered. As a result, the depth value for only the fully covered pixels are written, and because they are fully covered, it is the true depth (and not an extrapolated/clamped depth). The pixels that are only partially covered get discarded and no depth value is updated for such pixels.

Pass 2: Pixel Identification Pass

After this pass, a 2D surface is obtained that contains non-zero values for the pixels that have some partially visible primitives and require further treatment for visibility. The values in those locations indicate the number of primitives that can potentially be visible in those pixels. One can keep track of total number of primitives covering all the pixels of interest by incrementing the unordered access view (UAV) counter for the same UAV. Note that this is an approximate heuristic because the actual visibility inside these pixels can be more complicated than just the number of primitives touching those pixels.

According to preferred embodiments, the pixel identification pass may be performed according to the following steps:
1. Enable conservative rasterization and the depth test to read but turn the writes off.
2. Bind the depth-buffer generated in pass 1 as a depth buffer.
3. Bind an unordered access view as the size of render target and format UINT_8/16/32 and clear that UAV with all zeros. The size determines how many maximum number of primitives can touch the pixel (256, 64K or 4G respectively.)
4. Bind a pixel shader that accepts SV_InnerCoverage as input, but this pass skips processing fully covered pixels. Instead, for the pixels that are partially covered and pass the depth test, the shader marks those pixels as pixels of interest by incrementing the UAV at that location by one each time it gets invoked.

Improved Visibility Computation

Once complex pixels are identified, more accurate methods can be applied to compute visibility for these pixels. This can be accomplished by either 1) increasing the sub-pixel sampling rate with GPU ray tracing or 2) solving for visibility analytically.

GPU Ray Tracing with DXR

According to preferred embodiments, an improved visibility estimate is computed for complex pixels by point-sampling the sub-pixel area using GPU ray tracing. Recently, Microsoft announced DirectX Raytracing (DXR) API that leverages NVIDIA's RTX ray tracing technology and makes GPU ray tracing practical for real-time applications. GPU ray tracing also removes the hardware limits on the number and positioning of samples in a pixel in the conventional raster-based pipeline.

Point sampling visibility multiple times within a pixel provides a reasonable approximation (but not exact solution) with a sufficiently large number of samples. Rays traced (from, e.g., a DXR Ray Generation shader) can use the aforementioned primitive counts as a guideline for how to distribute rays across the sub-pixel area. More rays may be dedicated to pixels that are touched by larger number of primitives or a dynamic number of visibility or color sub-samples may be shot for per complex pixel.

Visibility with Non-DXR Based Ray Tracing

It may be possible to improve on sampling-based visibility determination techniques using analytical methods. An example process may be performed as follows:
1. Prime a buffer with enough space for N (number of ray samples) 64 bit entries per pixel to 0xffffffffffffffff
2. For the complex pixels (simple ones to be culled by e.g., stencil) re-render with conservative raster on
3. Use a fast GS to pass the world space vertices of the triangle to the pixel shader
4. In the pixel shader—for each sample s (1 . . . N)
   a. Setup a ray from the eye to the WS position of sample s in the pixels
   b. Compute the intersection with the current triangle with the ray—it hits the triangle
      i. Construct a 64 bit word (32:32) like this (DepthValue:ID)
         1. ID is a 32 bit word that identifies the object plus the primitive in the object
      ii. Update sample s of the current pixel using AtomicMin64(old, (DepthValue:ID))
      iii. If 32 a 32 bit ID is no enough one needs to use ROVs 5. Run over all complex pixels
   a. Run over all N samples
      i. Extract ID and re-compute ray intersection with triangle
      ii. Light intersection
      iii. Accumulate lighting
   b. Divide accumulated lighting by N
   c. Write result Additional Pixel Classification Methods Further embodiments to classify pixels and determine how many rays to cast when using GPU ray tracing may include:

1. Computing differences in the luminance of neighboring pixels
2. Computing differences in 3-tuple (primitiveID, instance IDs, drawCallID) of neighboring pixels. If tessellation is enabled, a unique id can be generated for each triangle that the tessellation generates using an atomic increment in the GS and using that instead of a primitive ID. With Tessellation enabled, primitiveID corresponds to patch ID.
3. Computing differences in material IDs or material parameters of neighboring pixels.
4. Computing differences in depth or surface normal of neighboring pixels.
5. Combinations of 1-4.
6. Temporal variants of combinations of 1-4.

Hybrid Deferred Ray-Traced Anti-Aliasing

Usually anti-aliasing is performed using a temporal screen space filter, or by applying techniques like Aggregate G-Buffer Anti-Aliasing (AGAA). AGAA is a technique for anti-aliased deferred rendering of complex geometry using graphics hardware. AGAA uses the rasterization pipeline to generate a compact, pre-filtered geometric representation inside each pixel. Shading is then performed at a fixed rate, independent of geometric complexity. By decoupling shading rate from geometric sampling rate, the algorithm reduces the storage and bandwidth costs of a geometry buffer, and allows scaling to high visibility sampling rates for anti-aliasing. However, conventional AGAA techniques do not adequately address complex pixels, and AGAA techniques alone may not be adequate for adaptively generating new per sub-sample information for complex pixels, which is a complicated process that typically requires several rendering passes over the scene.

Further embodiments of the present invention are directed to a novel alternative approach that generates additional 'sub-samples' only where necessary. The quality is scalable as one can shoot any number of rays. The solution is orthogonal to temporal filtering. According to such embodiments, there is no longer a need to do several rendering/rasterization passes over the scene. One could selectively only generate more samples for certain geometry types (e.g. leaves of trees etc.).

According to one or more embodiments, a fully scalable anti-aliasing solution is provided that perfectly combines the best of rasterization and accelerated ray-tracing using co-processing (via a tree traversal unit (TTU), for example) to generate a need for GPUs that can do fast and hardware accelerated ray-tracing.

One exemplary implementation is as follows:
1. Render a non-anti-aliasing g-buffer (see below for more details)
2. Find pixels that surround discontinuities in depth, brightness etc.
3. Shoot a number of rays (e.g., ray-trace) through the pixels found in step 2 to generate for g-buffer samples.

Another exemplary implementation is as follows:
1. Render non-anti-aliasing g-buffer
   a. Optionally render MSAA depth buffer only using target independent rasterization (TIR)
   b. Optionally render MSAA normals using TIR
2. Detect complex pixels
   a. Looking for depth/brightness and other incongruities/discontinuities
   b. Using MSAA depth and/or MSAA normals where necessary
3. Allocate storage for N-sample of g-buffer date for complex pixels
   a. One could also use a list of sub-samples per complex pixel
4. Shoot N rays per complex pixel (could use temporal filter here)
   a. Record g-buffer data for nearest hits
   b. Optionally, can iterate on result to adaptively shoot more rays
5. During deferred lighting—light ray hits are computed for complex pixels as well Adaptive Ray Tracing for Temporal Anti-Aliasing Existing temporal anti-aliasing algorithms (TAA) are widely used in video games today. One of the major limitations of such algorithms is that when it is identified that a particular pixel has diverged from the right value, there is no good approach to color that pixel and only a bunch of heuristics that fall apart depending on the root cause of sampling problems.

Typically, the heuristics select sample colors when the motion vectors and colors between frames indicate that the normal algorithm won't do the right thing. Instead of using a heuristic to choose a color, one or more embodiments of the present invention directly cast additional samples into the scene, and gather the information needed to choose the right color.

According to preferred embodiments, temporal anti-aliasing can be performed according to the process described below:

1. Use existing renderer (forward or deferred . . . or even ray traced primary rays) to generate rasterized image as usual. Probably MIP-bias towards oversharp
2. Run TAA pass
   a. *Detect when TAA data is "bad"/colors are probably not part of the pixel (this shows up as the point where "color clamp/clip" is needed; could also keep a smarter historical EMWVariance value)
   b. Don't use the TAA results for this pixel . . . instead mark the pixel for supersampled ray tracing. This can be with a sentinel value or an alpha channel.
3. Dispatch AA rays for pixels marked during TAA pass, write output to a SECOND texture
   a. *MSAA tap locations+the temporal subpixel offset, but never the central pixel produced by the raster pass already.
   b. *Run the exact same "pixel" shader HLSL code from the raster pass on the ray hits
   c. * . . . including using whatever AO/SSRT/subsurface/shadow map etc. screen-space input that pixel used for the regular raster pass. Raster shading should be matched for consistency
   d. According to embodiments, the process can be applied to opaque surfaces, under the assumption that transparency/particles/etc. have their own process for going through the pipeline as a separate pass and dealing with AA, just as they do in game engines today.

4. Blend the ray-traced anti-aliasing texture results with the color buffer
   a. *Uses Raster Operation because using atomics in the ray tracing pass with atomics would be slow.

Adaptive Temporal Antialiasing

In one embodiment, a pragmatic algorithm for real-time adaptive super-sampling in games is provided. It extends temporal antialiasing of rasterized images with adaptive ray tracing, and conforms to the constraints of a commercial game engine and today's GPU ray tracing APIs. The algorithm removes blurring and ghosting artifacts associated with standard temporal antialiasing and achieves quality approaching 8×supersampling of geometry, shading, and materials while staying within the 33 ms frame budget required of most games.

Introduction

Aliasing of primary visible surfaces is one of the most fundamental and challenging limitations of computer graphics. Almost all rendering samples surface at points within pixels, and thus produce error when the points sampled are not representative of the pixel as a whole, that is, when primary surfaces are undersampled. This is true regardless of whether the points are tested by casting a ray or the amortized ray casts of rasterization, and regardless of what shading algorithm is employed. Of course, analytic renderers such as perfect beam tracing in space and time could entirely avoid the ray (under)-sampling problem; despite some analytic solutions for limited cases, point samples from ray or raster intersections remain the only fully-developed approach for efficient rendering of complex geometry, materials, and shading. Even "point-based" renderers actually ray trace or splat onto rays via rasterization.

This aliasing due to undersampling manifests as jagged edges, spatial noise, and flickering (temporal noise). Attempts to conceal those errors by wider and more sophisticated reconstruction filters in space (e.g., MLAA and FXAA) and time (e.g., SMAA, TAA) can convert those artifacts into blurring (in space) or ghosting (blurring in time).

Under a fixed sample count per pixel across an image, the only true solution to aliasing is to increase the sample density and bandlimit the signal being sampled. Increasing density helps but does not solve the problem at rates affordable for real-time: supersampling (SSAA) incurs a cost linearly proportional to the number of samples while only increasing quality with the square root; multisampling (MSAA, CSAA, SBAA, SRAA) samples geometry and materials and shading at varying rates to heuristically reduce the cost but also lowers quality; and aggregation reduces cost even more aggressively but still limits quality at practical rates. For band-limiting the scene, material prefiltering by MIP-mapping and variants (e.g., LEAN), level of detail for geometry, and shader level of detail improve the undersampling. They also introduce other problems of overblurring or popping (temporal and spatial discontinuities) while complicating rendering systems and ultimately failing to completely address the problem.

The standard in real-time rendering is to employ many of the aforementioned strategies simultaneously. In the best cases, this indeed can nearly eliminate the perception of aliasing artifacts by the viewer. Despite admiring those successes, the primary aliasing challenge remains open for real-time because they are game-specific solutions that require significant engineering complexity and careful hand-tuning of scenes by artists.

These problems with undersampled rays for real-time and the undesirable cost or limitations of solutions are all due to the fixed sampling count per pixel. An adversary can always place material, geometric, or shading features between samples to create unbounded error, such as a very bright, very small light source that only rarely is sampled by the center of a pixel.

Offline ray-traced renderers have long employed high and adaptive sample counts to solve the aliasing problem simply and elegantly, where the renderer traces some high minimum number (e.g., 64) of samples per pixel and then traces additional batches of samples within that pixel until a maximum threshold or stable distribution is achieved. There was previously no practical way to adaptively sample in real time because almost all real-time rendering was based on the regular sample rates of rasterization. Even the naïve approach of stenciling potentially-aliased pixels and making a second, high-density pass for them is inefficient: rasterization requires processing all geometry, even if only a few pixels are affected. For instance, pixels in need of antialiasing may be aggressively identified based on course shading and high resolution geometry passes and may achieve nearly identical results to SSAA with 10% reduced frame time despite cutting the number of shading samples in half.

A method is provided for practical adaptive sampling in real time using a hybrid of ray tracing and rasterization. This method may be enabled by the recently released DirectX Ray Tracing API (DXR). DXR allows for full interoperation between data structures and shaders for both types of rendering across the full game engine, eliminating the previous impracticality of duplicating those between ray and raster APIs for hybrid approaches.

Adaptive sampling is built upon by showing how to efficiently combine these techniques for modern graphics hardware, and how to leverage adaptive sampling within the context of temporal antialiasing to still amortize the cost of rasterized samples in time without creating blurring or ghosting.

Temporal Antialiasing

Temporal antialiasing [8] (TAA) is fast and quite good in the cases it can handle. TAA applies a subpixel shift to the image plane shift each frame and then accumulates an exponentially-weighted moving average over previous frames, each of which was rendered with only one sample per pixel. On static scenes, this approaches the quality of full screen supersampling.

For dynamic scenes, TAA 'reprojects' samples from the accumulated history buffer by offsetting texture fetches along per-pixel motion vectors previously generated by the rasterizer pass.

TAA fails in several cases. When new screen areas are disoccluded (revealed) by object motion, those are not represented in the history buffer, or are misrepresented by the motion vectors. Camera rotation and backwards translation also create thick disocclusions at the edges of the screen. Subpixel features such as wires and fine material details can slip between consecutive offset samples and thus are unrepresented by motion vectors in the next frame. Transparent surfaces create pixels at which the motion vectors from opaque objects do not match the total movement of represented objects. Finally, shadows and reflections do not move in the direction of the motion vectors of the surfaces that are shaded by them.

When TAA fails, it either produces ghosting (blurring due to integrating incorrect values) or reveals the original aliasing as jaggies, flicker, and noise. Standard TAA attempts detects these cases by comparing the history sample to the local neighborhood of the corresponding pixel in the new frame. When they appear too different, TAA employs a variety of heuristics to clip, clamp, or interpolate in color space. The best practices for these heuristics change frequently and no general purpose solution has previously been found.

Exemplary Algorithm

One exemplary method is designed for compatibility with conventional game engines and to harness the strengths of TAA, while addressing its failures unequivocally and simply.

One exemplary idea is to run the base case of TAA on most pixels and then, rather than attempting to combat its failures with heuristics, instead output a conservative segmentation image of where it will fail, and why. The complex heuristics of TAA at failure pixels may be replaced with robust alternatives, adapting to the image content.

Figure 8:
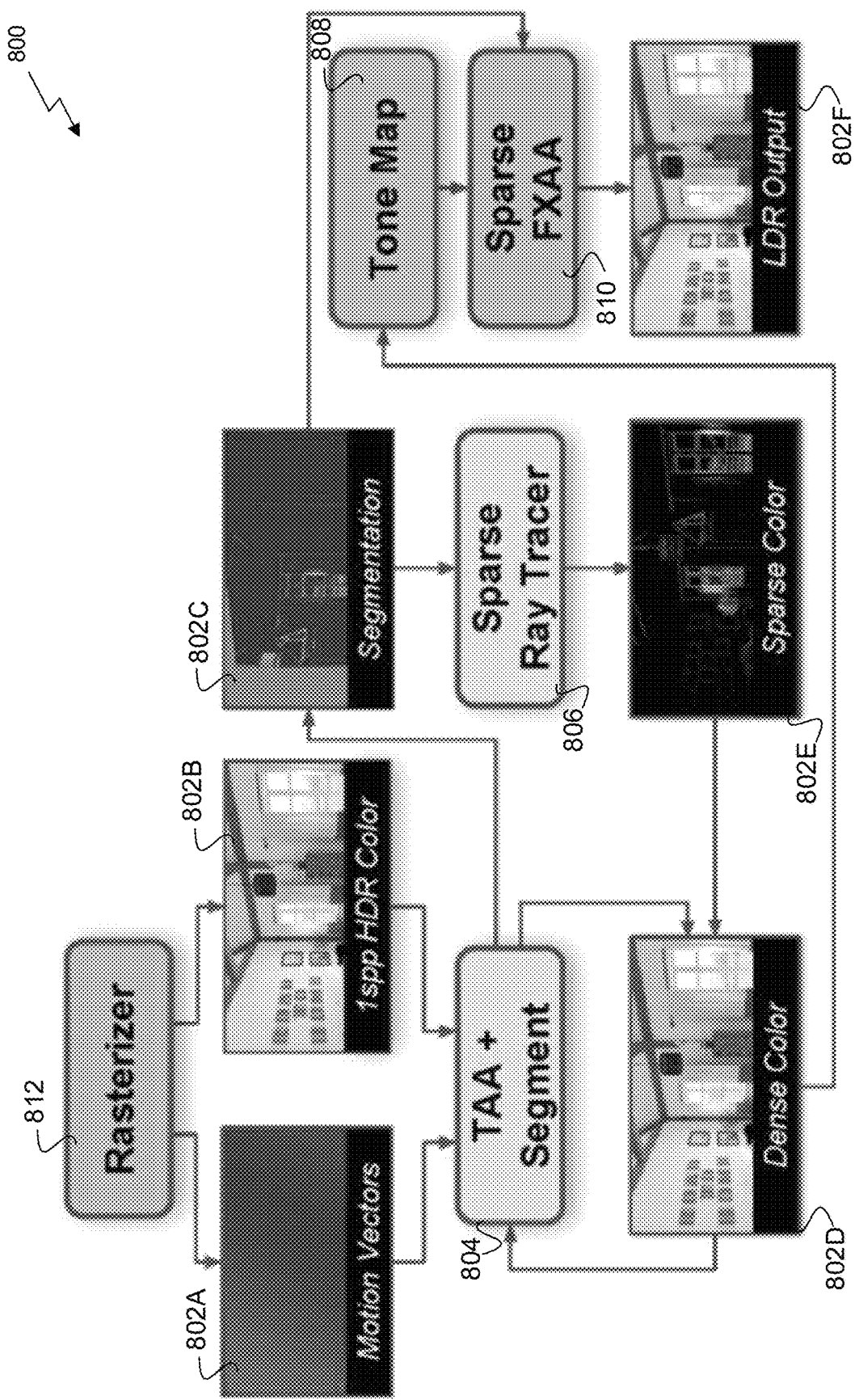
FIG. 8 illustrates an exemplary adaptive temporal antialiasing algorithm in the context of a DXR ray tracing API, in accordance with one embodiment.

FIG. 8 shows an exemplary adaptive temporal antialiasing algorithm 800 in the context of a DXR ray tracing API, according to one exemplary embodiment. In the diagram, rectangular pictures 802A-F represent visualizations of buffers and rounded rectangles 804-812 represent shader passes. Not all intermediate buffers are shown. For example, where the previous frame's output feeds back as input to TAA, the associated ping-pong buffers are not shown.

In one embodiment, a segmentation image is stored in the alpha channel of the TAA output in practice. Within the image, ray traced super sampling will be applied to a first set of pixels. The first set of pixels represent cases where the history sample deviated significantly from the corresponding neighborhood in the new frame (TAA's usual metric for color clipping and producing noise), as well as pixels identified as depth edges or high material gradients. Including the additional terms ensures that conservative ray tracing is applied to potential sources of aliasing not detected by the history alone. A second set of pixels within the image include disocclusions. These would be expensive to ray trace because they can be large and are often only present for a single frame, such as at the edge of the screen during rotation. The second set of pixels may be identified by motion vector failures, and FXAA is run on only those pixels. In the special case of the first frame after a camera cut or scene load, all pixels may be classified within the second set. A third set of pixels within the segmentation image are ones at which TAA has succeeded in its base case.

Because the frame is almost always dominated by TAA pixels in the third set, the cost of ray tracing is highly amortized and requires a ray budget far less than one sample per pixel. For example, if six percent of the segmentation falls within the first set, then 8×ray traced supersampling may be adaptively employed at a cost of less than 0.5 rays per pixel. Yet the quality is comparable to 8×supersampling everywhere; were it not, the boundaries between segmented regions would flicker in the final results because different algorithms are employed. That feathering the transition at those boundaries is not needed indicates that all three integrated strategies are converging to similar results under this segmentation approach.

In another embodiment, the first set may be ray traced. For example, rays may be cast in the 8×MSAA n-rooks subpixel sampling pattern, the same samples employed by 8×TAA. No temporal jitter may be used. The ray cast is implemented as a DXR ray generation shader. At rays hit, the full UE4 node-based material graph and shading pipeline may be directly run, using identical HLSL code to the raster pipeline. Since forward-difference derivatives are not available in ray generation shaders, they may be treated as infinite to force the highest resolution of textures. Thus, supersampling may be relied upon alone to address material aliasing (which is how most film renderers operate, for the highest quality); an alternative would be to use distance and orientation to analytically select a MIP level, or to employ ray differentials as a replacement for raster differences.

The pixels processed with FXAA cost less than those within the third set at which TAA succeeded, but much less than supersampled ray traced pixels. FXAA works well here because it requires no historical data, and it runs on the low dynamic range post-tonemapped output to conserve memory bandwidth. By running FXAA only at disoccluded pixels its cost is reduced compared to typical full-screen applications; typically to less than 15% even for rapid object and camera movement.

CONCLUSION

Primary surface aliasing is a cornerstone problem in computer graphics. One exemplary solution for offline rendering is adaptive supersampling. This was previously impractical for rasterization renderers in the context of complex materials and scenes because there was no way to efficiently rasterize sparse pixels. Even the most efficient GPU ray tracers required duplicated shaders and scene data. While DXR solves the technical challenge of combining rasterization and ray tracing, applying ray tracing to solve aliasing by supersampling was nontrivial: knowing which pixels to supersample when given only 1spp input, and reducing the cost to something that will scale are not solved by naively ray tracing. A practical solution to this problem is demonstrated; so practical that it runs within a commercial game engine, operates in real-time even on first-generation real-time ray tracing commodity hardware and software, and connects to the full shader pipeline. Where film renderers choose pixels to adaptively supersample by first casting many rays per pixel, that cost instead is amortized over many frames by leveraging TAA's history buffer to detect aliasing. Additionally, large, transient regions of aliasing are identified due to disocclusions and post processed FXAA is employed there rather than expending rays. This hybrid strategy leverages advantages the most sophisticated real-time antialiasing strategies but avoids their limitations. By feeding supersampled results back into the TAA buffer, the probability that those pixels will not trigger supersampling on subsequent frames is increased, further reducing cost.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
applying temporal antialiasing (TAA) to an image, wherein for each pixel of at least a subset of pixels, the TAA compares a historical value for the pixel in a previous frame with current values of neighboring pixels to the pixel in a current frame;
identifying failure pixels resulting from applying the TAA to the image, where each pixel of the at least a subset of pixels with the historical value that differs from the current values of the neighboring pixels by more than a predetermined amount is identified as a failure pixel; and
performing antialiasing on each of the failure pixels, utilizing a combination of ray tracing and fast approximate anti-aliasing (FXAA).

2. The method of claim 1, wherein the failure pixels are identified utilizing results of applying the TAA to the image, utilizing intermediate data, or utilizing source geometry.

3. The method of claim 1, wherein the image is created utilizing forward rendering or deferred rendering.

4. The method of claim 1, wherein each pixel of the at least a subset of pixels having a depth value for a pixel that differs from depth values for neighboring pixels by more than a predetermined amount is identified as a failure pixel.

5. The method of claim 1, wherein each pixel of the at least a subset of pixels having a luminance value for a pixel that differs from luminance values for neighboring pixels by more than a predetermined amount is identified as a failure pixel.

6. The method of claim 1, wherein the failure pixels are marked using a sentinel value.

7. The method of claim 1, wherein the failure pixels are included within a segmentation mask.

8. The method of claim 1, wherein performing the antialiasing includes determining point-sampling visibility for a sub-pixel area within each of the failure pixels, utilizing GPU ray tracing.

9. The method of claim 1, wherein results of performing the antialiasing on the failure pixels are combined with the results of applying the TAA to the image to create an output image.

10. The method of claim 1, further comprising:
identifying one or more pixels for which no temporal information exists; and
performing antialiasing on the identified one or more pixels, utilizing fast approximate anti-aliasing (FXAA).

11. The method of claim 10, further comprising:
creating an output image by combining results of applying the TAA to the image, results of performing the antialiasing on the failure pixels, and results of performing the antialiasing on the one or more pixels for which no temporal information exists.

12. The method of claim 1, wherein results of applying the TAA to the image includes a color buffer for a second set of pixels of the plurality of pixels, and wherein results of performing the antialiasing on the failure pixels includes textures for a first set of pixels of the plurality of pixels that include the failure pixels.

13. The method of claim 12, wherein a portion of the color buffer associated with the failure pixels is discarded.

14. The method of claim 13, further comprising:
creating an output image by blending the textures with the color buffer.

15. A system comprising:
a processor that is configured to:
apply temporal antialiasing (TAA) to an image, wherein for each pixel of at least a subset of pixels, the TAA compares a historical value for the pixel in a previous frame with current values of neighboring pixels to the pixel in a current frame;
identify failure pixels resulting from applying the TAA to the image, where each pixel of the at least a subset of pixels with the historical value that differs from the current values of the neighboring pixels by more than a predetermined amount is identified as a failure pixel; and
perform antialiasing on each of the failure pixels, utilizing a combination of ray tracing and fast approximate anti-aliasing (FXAA); and
a memory that is configured to store results of the antialiasing.

16. The system of claim 15, wherein the failure pixels are identified utilizing results of applying the TAA to the image, utilizing intermediate data, or utilizing source geometry.

17. The system of claim 15, wherein the image is created utilizing forward rendering or deferred rendering.

18. The system of claim 15, wherein each pixel of the at least a subset of pixels having a depth value for a pixel that differs from depth values for neighboring pixels by more than a predetermined amount is identified as a failure pixel.

19. The system of claim 15, wherein each pixel of the at least a subset of pixels having a luminance value for a pixel that differs from luminance values for neighboring pixels by more than a predetermined amount is identified as a failure pixel.

20. The system of claim 15, wherein the failure pixels are marked using a sentinel value.

21. The system of claim 15, wherein the failure pixels are included within a segmentation mask.

22. A non-transitory computer-readable storage medium storing instructions that, when executed by a processor, causes the processor to perform steps comprising:
applying temporal antialiasing (TAA) to an image, wherein for each pixel of at least a subset of pixels, the TAA compares a historical value for the pixel in a previous frame with current values of neighboring pixels to the pixel in a current frame;
identifying failure pixels resulting from applying the TAA to the image, where each pixel of the at least a subset of pixels with the historical value that differs from the current values of the neighboring pixels by more than a predetermined amount is identified as a failure pixel; and
performing antialiasing on each of the failure pixels, utilizing a combination of ray tracing and fast approximate anti-aliasing (FXAA).

* * * * *